UNITED STATES PATENT OFFICE.

LESTER ALBERT PRATT, OF WINCHESTER, AND FRANCIS NEWTON BRINK, OF WOBURN, MASSACHUSETTS, ASSIGNORS TO MERRIMAC CHEMICAL COMPANY, OF NORTH WOBURN, MASSACHUSETTS, A CORPORATION OF MASSACHUSETTS.

MANUFACTURE OF NAPHTHALENE TRISULFONIC ACID.

1,311,090.        Specification of Letters Patent.        Patented July 22, 1919.

No Drawing.      Application filed August 31, 1918. Serial No. 252,233.

*To all whom it may concern:*

Be it known that we, LESTER ALBERT PRATT and FRANCIS NEWTON BRINK, citizens of the United States, residing at (1) Winchester, (2) Woburn, in the county of Middlesex and State of Massachusetts, have invented certain new and useful Improvements in the Manufacture of Naphthalene Trisulfonic Acid, of which the following is a specification.

This invention relates to the sulfonation of naphthalene, the object of the invention being the provision of a method whereby the sulfonation may be readily accomplished, with a good yield, and while leaving in the immediate product of sulfonation a relatively small proportion of uncombined sulfuric acid, as compared with the processes now commonly employed.

Our preferred operating method is as follows, it being understood that our invention is not restricted to the employment of the reacting bodies in the particular proportions and at the specific temperatures therein mentioned:

Naphthalene is treated with an approximately equal weight of 100% sulfuric acid, and the temperature raised to 160° C. for about eight hours. By this procedure, a large proportion of the naphthalene is converted into naphthalene β mono-sulfonic acid. The mixture wherein the residual acid serves provisionally as a solvent for the β mono-sulfonic acid is allowed to cool somewhat and strong oleum (preferably about 60 per cent. free $SO_3$) is run in slowly. The temperature is then raised to 160°–180° C. for about four hours. The naphthalene β mono-sulfonic acid is thereby converted into naphthalene—1-3-6 trisulfonic acid in good yield. The amount of oleum employed is preferably sufficient not only to furnish the two $SO_3$ groups for each molecule of naphthalene β mono-sulfonic acid present, but also to raise the strength of the dilute sulfuric acid remaining in contact with the mono-sulfonic acid to approximately 100% sulfuric acid at the finish of the reaction.

By this procedure, we are able to obtain a much better yield of naphthalene 1-3-6 trisulfonic acid than by any of the well known processes. Further, we are able to employ a very strong oleum while introducing the second and third $SO_3$ groups, since naphthalene β mono-sulfonic acid can be subjected to more vigorous action than can naphthalene itself, without decomposition. The use of this strong oleum is especially advantageous because there remains at the completion of the reaction, a much smaller amount of sulfuric acid, which subsequently has to be neutralized in case the naphthalene 1-3-6 trisulfonic acid is to be converted into important intermediate compounds for the manufacturer of dyes.

We claim:—

1. Method of preparing naphthalene trisulfonic acid, comprising mono-sulfonating naphthalene by means of sulfuric acid of approximately 100% concentration, and thereafter introducing oleum into the acid mixture and continuing the sulfonation to produce the trisulfonic body.

2. Method of preparing naphthalene trisulfonic acid, comprising mono-sulfonating naphthalene by means of sulfuric acid of approximately 100% concentration, and thereafter introducing oleum into the acid mixture and continuing the sulfonation to produce the trisulfonic body, the oleum being added in proportion to insure a concentration in the residual uncombined acid of approximately 100% $H_2SO_4$.

In testimony whereof we affix our signatures.

LESTER ALBERT PRATT.
FRANCIS NEWTON BRINK.